Sept. 13, 1955  J. D. LOVELEY ET AL  2,717,508
WINDOW MOUNTED AIR CONDITIONER
Filed April 7, 1954  4 Sheets-Sheet 3
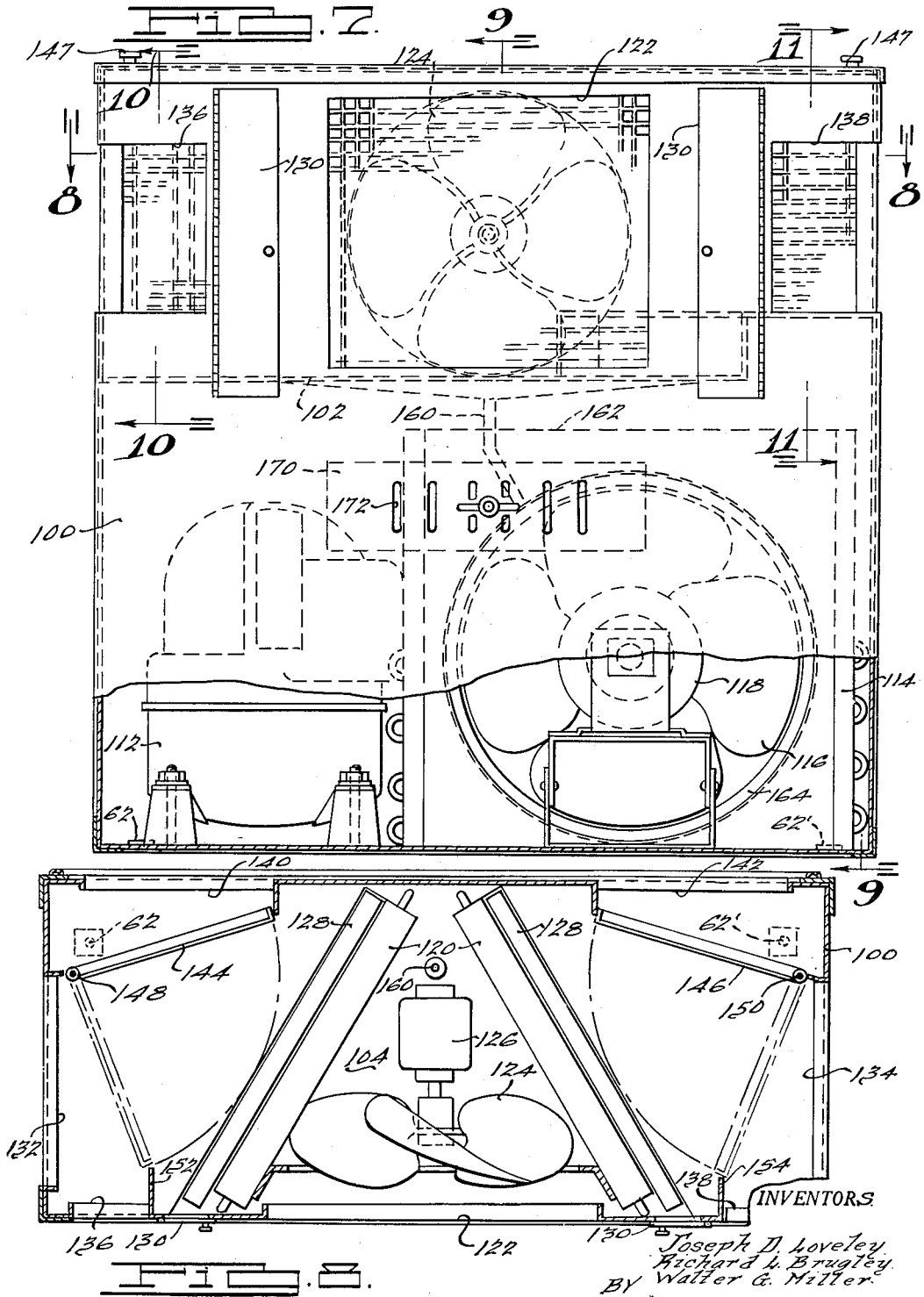
INVENTORS
Joseph D. Loveley
Richard L. Brugley
BY Walter G. Miller
Harness and Harris
ATTORNEYS Sept. 13, 1955  J. D. LOVELEY ET AL  2,717,508
WINDOW MOUNTED AIR CONDITIONER
Filed April 7, 1954  4 Sheets-Sheet 4
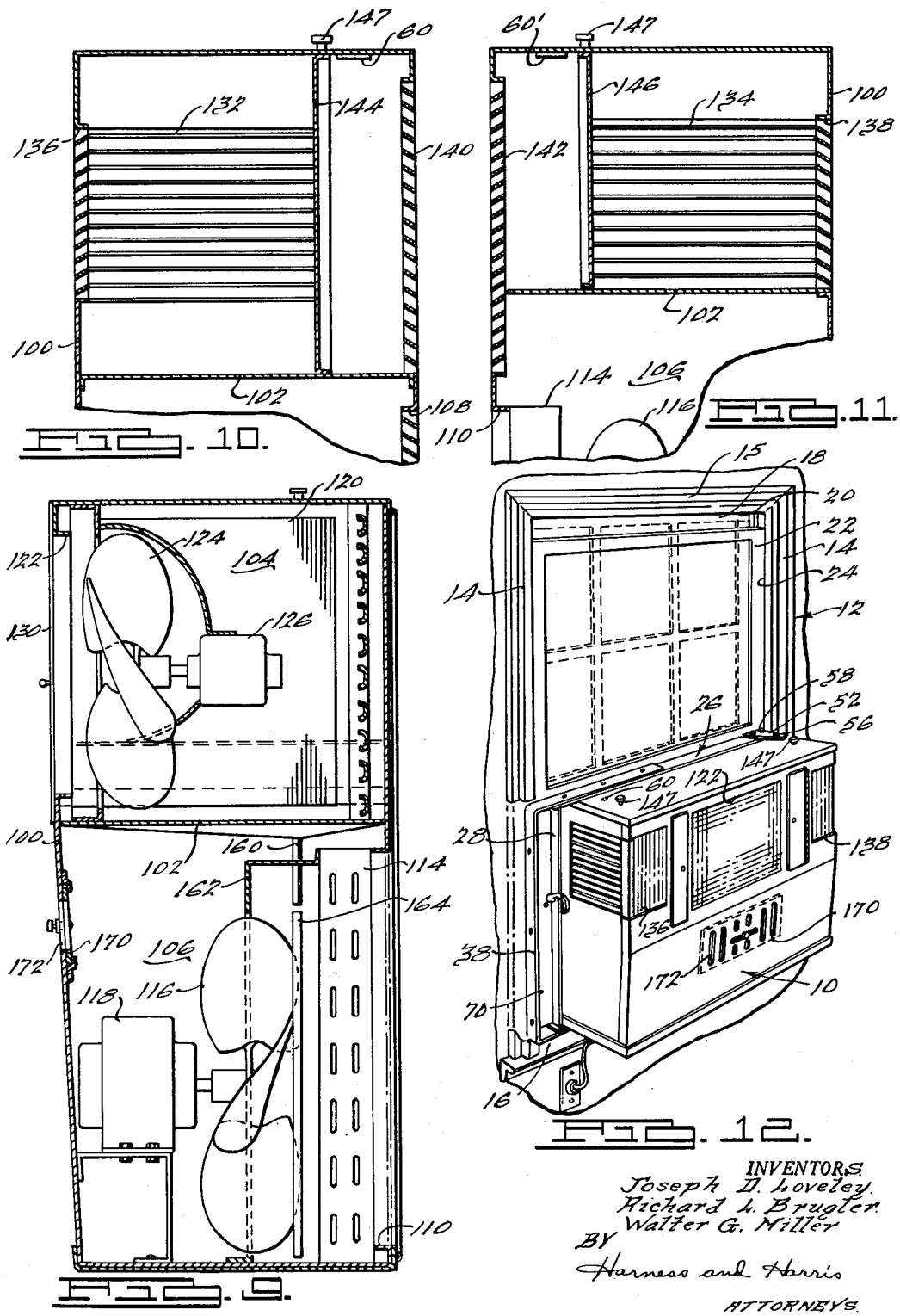
INVENTORS
Joseph D. Loveley
Richard L. Brugler
Walter G. Miller
BY Harness and Harris
ATTORNEYS

United States Patent Office 2,717,508
Patented Sept. 13, 1955

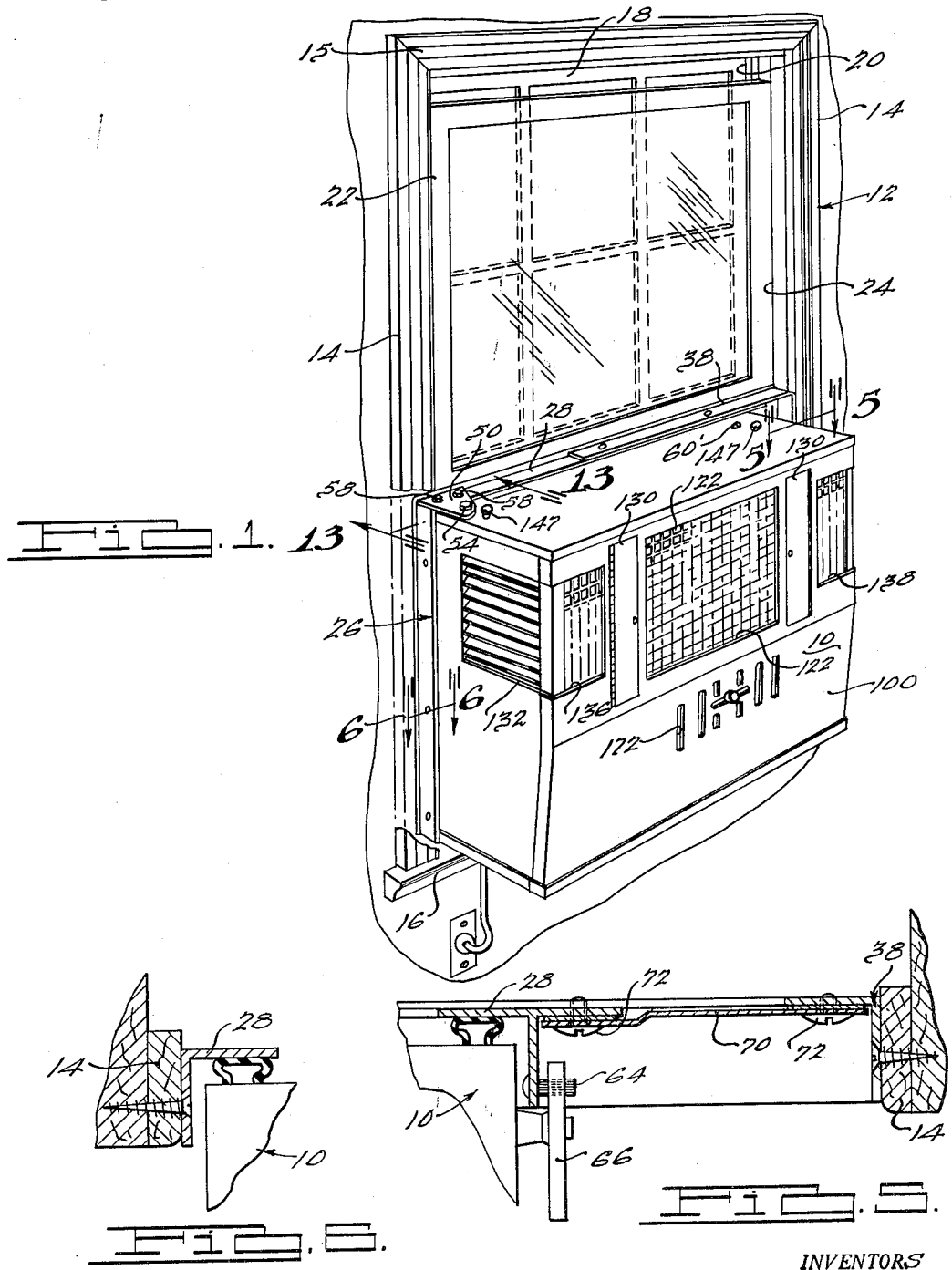

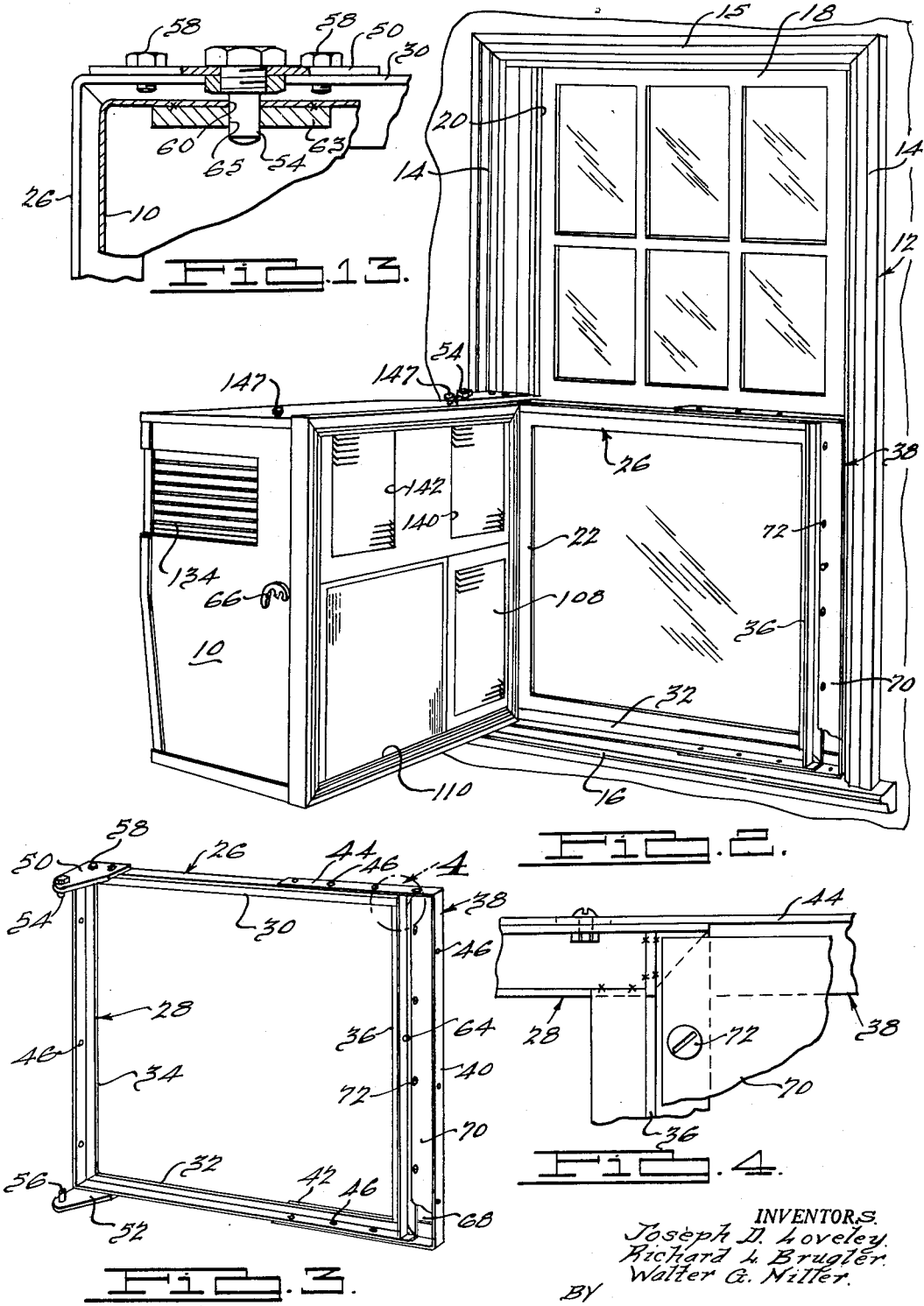

2,717,508

WINDOW MOUNTED AIR CONDITIONER

Joseph D. Loveley, North Dayton, Richard L. Brugler, Trotwood, and Walter G. Miller, Dayton, Ohio, assignors to Chrysler Corporation, Highland Park, Mich., a corporation of Delaware Application April 7, 1954, Serial No. 421,642

9 Claims. (Cl. 62—129)

This invention relates to an improved window mounted air conditioner including an air cooling unit and a mounting assembly therefor which are particularly adapted for use in combination with sash type windows.

Many modern window air conditioning units are designed for installation with the unit resting on the window sill and extending through the window opening with a portion of the unit within the room and a portion of the unit projecting outwardly beyond the window. Such units are objectionable in that they are balanced on the window sill and could be dislodged and fall into the street below. In addition, units of this type require that the lower sash of a double hung sash type window be maintained in a raised position in overlapping relationship with the upper sash thereby interfering with washing the opposed surfaces of the overlapped sashes. They also interfere with window washing in other ways for they present a hazard to professional window washers who may trip over them while working on the exterior of the building and, in addition, these professional window washers who wash windows from the outside of tall commercial buildings frequently desire to crawl out through the window and units of this type prevent them from doing so.

Units of the above mentioned type which extend through a window and rest upon the sill are also objectionable in that they require that the entire heavy unit be removed from the window whenever it is desired that the window be closed or the unit serviced. Since closing of the window is required to accommodate washing of the window and to accommodate the use of winter storm windows this is a serious disadvantage. Removal of such units is an appreciable task due to the weight of the unit and generally requires at least two men for its accomplishment.

It is a principal object of this invention to provide an air cooling unit and a mounting assembly therefor that are particularly adapted for use with double hung sash type windows and that offer no interference to the closing of the window thereby rendering it unnecessary to remove the unit for winter storage when the unit is not in use or when it is desired to add winter storm windows to the building.

It is a further object of the invention to provide an air cooling unit and a mounting assembly that possess the above advantages and, in addition, provide a pivotal mounting of the unit on its mounting assembly that is so simple to operate that it may in fact readily be accomplished by the average housewife. The simple operation of swinging the unit inwardly away from the window facilitates window washing and access to the rear of the unit for service. In addition, by means of the simple expedient of swinging the unit inwardly away from the window the professional window washer is able to use the window opening as a means to crawl to the outside of the building.

It is recognized that there have been units described which have been pivotally mounted as illustrated in United States Patent Number 2,316,640 which issued April 13, 1943, to B. S. Williams. The units shown in the Williams patent however, extend through the window opening and project outside of the building. Such units require that the lower sash be maintained in a raised position in overlapping relationship with the upper sash thereby interfering with closing of the window. It should be noted that the window washer working from the outside of a building such as a hotel would be unable to wash the outer surface of the lower sash which is overlapped by the upper sash and that he would have to have someone pivot each of the air conditioners out of their respective windows. In addition, the Williams device projects outwardly of the window opening thereby interfering with the installation of storm windows. Furthermore, since it projects beyond the window opening such units are inherently hazardous both with respect to the possibility of becoming dislodged and falling into the street and with respect to interfering with the safe footing of a professional window washer. The Williams device also requires side wings and mounting structure that are located in the tracks for the window sash. Such side wings and mounting structure interfere with vertical movement of the window sash.

It is a principal object of this invention to pivotally mount an air cooling unit on a mounting assembly which is retained in a window opening inwardly of the plane of the lower window sash so that neither the cooling unit nor the mounting assembly interfere with vertical movement of the window sash.

It is also an object of this invention to provide a mounting assembly for a window mounted cooling unit that accommodates pivotal movement of the unit and in addition provides a convenient means for detaching the unit from the mounting assembly to facilitate removal of the unit without removing the mounting assembly.

It is a further object of the invention to provide an air cooling unit and a mounting assembly therefor that are readily adapted to accommodate the selective installation of the unit for pivotal movement about a first vertical axis adjacent one side of the window opening or a second vertical axis adjacent the opposite side of the window opening.

In the drawings:

Fig. 1 is a perspective view of our air conditioning unit installed in a double hung sash type window;

Fig. 2 is a perspective view showing the air conditioning unit pivoted into the room;

Fig. 3 is a perspective view of the mounting assembly for the unit;

Fig. 4 is an enlarged view of the portion of the mounting assembly designated by the numeral 4 and broken circle in Fig. 3;

Fig. 5 is a section on the line 5—5 of Fig. 1;

Fig. 6 is a section on the line 6—6 of Fig. 1;

Fig. 7 is a front view of the air conditioning unit with a portion of the casing broken away;

Fig. 8 is a horizontal section of the air conditioning unit taken on the line 8—8 of Fig. 7;

Fig. 9 is a vertical section taken on the line 9—9 of Fig. 7;

Fig. 10 is a partial vertical section taken on the line 10—10 of Fig. 7;

Fig. 11 is a partial vertical section taken on the line 11—11 of Fig. 7;

Fig. 12 is a perspective view similar to Fig. 1 but on a reduced scale and showing the air conditioning unit mounted for pivotal movement about an axis on the opposite side of the window and casing to that illustrated in Fig. 1; and Fig. 13 is a partial vertical section taken on the line 13—13 of Fig. 1.

A window mounted air conditioner which is indicated generally by the numeral 10 in Fig. 1 is mounted in registry with a portion of the window opening of a double hung sash type window which is generally indicated by the numeral 12. The window 12 includes right and left vertical stop members 14, a horizontal upper stop member 15 and a sill 16 which cooperate to define the window opening. In addition, the window 12 includes an upper sash 18 which is slidably mounted in an outer track 20 in a conventional manner. A lower sash 22 is slidably mounted in an inner track 24 and in Fig. 1 the lower sash 22 is illustrated as raised into overlapping relationship with the upper sash 18 to expose the bottom portion of the window opening for the admission and discharge of air to the air conditioning unit 10 in a manner to be described herein.

A mounting assembly 26 is illustrated in perspective in Fig. 3 and this assembly is adapted for installation in the window 12 inwardly of the vertical plane containing the track 24 so that even with the mounting assembly installed the lower sash 22 is unobstructed in its vertical sliding movement in track 24.

The mounting assembly 26 includes a hollow rectangular metal frame 28 which is formed of metal having an angular section and a U-shaped portion 38 which is telescopically assembled with the rectangular frame 28 so that they cooperate to form an assembly which will be referred to herein as a hollow rectangular metal frame and which is adapted to fit windows of various widths. The frame 28 includes top and bottom portions 30 and 32 and side portions 34 and 36. The U-shaped portion 38 of the mounting assembly includes a vertical bar 40 which is adapted to be fastened to a window stop member 14 and, in addition, includes a pair of laterally extending legs 42 and 44 which overlap the rectangular frame portion 28. The top and bottom portions 30 and 32 of the rectangular frame portion and the laterally extending legs 42 and 44 of the U-shaped portion are each provided with a series of holes 46 for the reception of screws so that the frame components may be secured together and to the window stop members and sill in a particular installation. By selectively mating the holes 46 on the horizontal components the overall width of the mounting assembly 26 may be varied to accommodate installation in windows of different widths.

The rectangular frame portion 28 has dimensions that approximate the dimensions of the outer portion of the air conditioning unit 10 so that the latter is received therein but restrained from moving outwardly by the vertical portion of the angle shaped frame components.

The mounting assembly 26 is provided with a pair of inwardly extending plates 50 and 52 which respectively carry vertically extending hinge pins 54 and 56. The inwardly extending plates 50 and 52 are bolted to the upper and lower portions 30 and 32 respectively of the mounting assembly by bolts 58 and the hinge pins 54 and 56 are adapted to be received in openings 60 and 62 in the casing of the air conditioning unit 10 to thereby provide a vertical axis about which the air conditioning unit 10 may be swung inwardly of the room. A suitable plate 63 provided with a hinge pin opening 65 may be welded to the inner side of the casing of air conditioner 10 if desired to strengthen the area adjacent the hinge pin opening. One hinge assembly is illustrated in detail in Fig. 13. The air conditioning unit 10 may be removed from the window without removing the mounting assembly 26 by removing hinge pins 54 and 56 or removing plates 50 and 52 by removing the bolts 58 which hold the plates on the mounting assembly 26.

As illustrated in Fig. 5 the mounting assembly or hollow rectangular metal frame 26 is further provided with a pin 64 on vertical leg 36 of the rectangular frame 28 which is adapted to cooperate with a pivotally mounted handle 66 which is provided on the casing of air conditioning unit 10 to form a latch.

In those installations in which the U-shaped frame 38 is extended laterally from the rectangular frame 28 an opening is created at 68 in Fig. 3. It is intended that this opening be covered with a strip 70 of any suitable material which will seal the room against the admission of outside air. Plywood or metal sheets may be cut to size and screwed to the frame members 28 and 38 by screws 72 as illustrated in Fig. 5.

Fig. 12 illustrates an installation of the unit 10 in a window 12 which resembles the installation described in connection with Fig. 1 except that the mounting assembly 26 has been rotated 180 degrees so that the hinge pins 54 and 56 are on the right side of Fig. 12 whereas they were on the left side of Fig. 1. The hinge pin 56 is, of course, above the hinge pin 54 in this installation. In some installations doors or walls make it more desirable to have the unit pivoted from one side than the other and our novel mounting assembly is capable of accommodating either installation. The casing of the air conditioning unit 10 is provided with openings 60' and 62' on the right side thereof for reception of the hinge pins 56 and 54 respectively for the Fig. 12 installation.

The air conditioning unit 10 includes a casing 100 and a substantially horizontal partition 102 therein which subdivides the casing into an upper evaporator compartment 104 and a lower condenser and compressor compartment 106. Openings 108 and 110 are provided in the rear wall of the compartment 106 and they respectively accommodate the admission and discharge of air for cooling a compressor 112 and a condenser 114 which are mounted in compartment 106. The condenser 114 preferably is mounted in a substantially vertical plane in registry with the opening 110 and the compressor is laterally displaced from the condenser 114 and mounted generally behind the opening 108. A fan 116 is provided in compartment 106 and is preferably located behind the condenser 114 and driven by an electric motor 118. The fan induces the circulation of air from outside the building in through opening 108, over compressor 112 and out through condenser 114 and opening 110.

The evaporator compartment 104 which is superimposed on the compartment 106 contains a pair of laterally displaced evaporator coils 120 which straddle a discharge opening 122 provided in the front wall of the casing 100. The ends of the evaporator coils 120 which are located in proximity to the window converge so that in the Fig. 8 plan view of the compartment 104 the evaporator coils give a generally V-shaped appearance and a fan 124 is located in the bight between the evaporator coils. An electric motor 126 is provided to drive fan 124 which is adapted to discharge air into the room through opening 122.

Each of the evaporator coils has a conventional filter 128 in registry with it and small doors 130 are provided in the front wall of the casing 100 to permit access to the filters 128 for their removal.

The compartment 104 is also provided with air inlet openings 132 and 134 which are located in the side walls of the casing 100 in fluid flow communication with compartment 104. Supplemental openings 136 and 138 are provided in the front wall of the casing for additional fluid flow communication between the room and compartment 104. The openings 132, 134, 136 and 138 thus serve to admit room air to casing 104 so that this air may be drawn through the evaporator coils 120 and discharged by fan 124 through opening 122 into the room.

It is usually desirable in room air conditioners to provide means for the admission of fresh outside air and to this end the casing 100 provided with a pair of openings 140 and 142 in the rear wall thereof which are in fluid flow communication with compartment 104. A pair of dampers 144 and 146 are provided in the upper evaporator compartment 104 and these dampers are pivotally mounted about vertical axes 148 and 150 so that they may be moved. In one of these positions which is shown in solid lines in Fig. 8 the openings 140 and 142 are blocked against the admission of fresh air. A pair of small wall members 152 and 154 project inwardly from the front wall of the casing 100 between the openings 136 and 138 in the front wall of the casing 100 and the associated evaporator coil 120. The small wall members 152 and 154 cooperate with dampers 144 and 146, respectively, and when the dampers are pivoted to the extreme position illustrated in broken lines in Fig. 8 in which all recirculation of room air is obstructed from openings 132, 134, 136 and 138 while fresh air is admitted freely from openings 140 and 142. If desired the dampers 144 and 146 may be adjusted to any intermediate position which will provide a mixture of fresh air and recirculate room air. The fan 124 of course draws whatever air is admitted to the compartment 104 and induces a circulation of such air through the filter 28 for cleaning and through the evaporator coils 120 for cooling followed by subsequent discharge into the room through opening 122. Suitable knobs 147 are provided on the exterior of the casing 100 to provide means for manually adjusting the positions of dampers 144 and 146.

The partition 102 which separates the evaporator compartment 104 from the compressor and condenser compartment 106 is preferably formed as a water receptacle with a depressed central portion in which water accumulates by dripping from the evaporator coils. This water drains by gravity through a pipe 160 which penetrates a shroud 162 provided around a portion of the fan 116 in the condenser and compressor compartment 106. The fan 116 preferably carries a slinger ring 164 so that water which drains from tube 160 and accumulates in the base of the casing 110 inside of shroud 162 is picked up by the slinger ring 164 and thrown outwardly into contact with the hot condenser coil 114 for subsequent evaporation and dissipation into the outside air. The moisture may, of course, contact the slinger ring or fan while falling and never reach the base of casing 110, but in either event it is thrown outwardly and dissipated.

It has been found desirable to augment the amount of air available for cooling the condenser and this is accomplished by elevating a portion of the partition 102 on the right side of the unit as viewed in Figs. 1 and 7 so that actually the opening 142 which has heretofore been described as an outside air inlet opening has a small portion that is located below the partition 102 so that some air admitted into the lower portion of opening 142 is drawn by fan 116 downwardly into the condenser and compressor compartment 106 for subsequent discharge into the condenser to augment the above described condenser cooling. This is best shown in Figure 11.

A sliding door 170 and a plurality of openings 172 are provided in the front wall of casing 10 for the exhaust of stale air from the room. Movement of the sliding door 170 exposes the openings 172 which lead into the compressor and condenser compartment 106 so that operation of the fan 116 may be utilized to exhaust air from the room out through the condenser coil 114. This is sometimes referred to as room pump out and it should be noted that fan 116 will draw air from the room even though it may also draw some air in from the outside through opening 108.

It will thus be seen that a room cooling unit and mounting assembly therefor have been described which will accommodate the installation of the room cooling unit in association with a double hung sash type window so that both sashes of the window may be raised, lowered and locked without interference from the room cooling unit and the room cooling unit is pivotally mounted to accommodate swinging the unit inwardly into the room as illustrated in Fig. 2 by simply manipulating the lock 66 and swinging the unit about the hinge pins 54 and 56. The operator does not have to support the weight of the unit and, therefore, this becomes an operation that is easy for one person to accomplish. Swinging the unit into the room in the manner described is beneficial for it permits ready access to the outside of the window through the window opening and permits access to the windows for washing and access to the unit for servicing without the difficult task of bodily lifting out of the window opening.

We claim:

1. An air conditioning device for application to a double hung sash type window mounted in the exterior wall of a room and having a window frame including vertical stop members, a horizontal sill member extending between said stop members and upper and lower sashes mounted for vertical sliding movement in said window frame, said stop members and said sill extending inwardly from said window sashes, said air conditioning device comprising a hollow rectangular metal frame and a room cooling unit, said metal frame having a bottom portion adapted to be secured to said sill, side portions adapted to be secured to said stop members and an upper portion spanning the space between said side portions, said metal frame being adapted for mounting inwardly of said sashes so that vertical movement of the sashes is not impaired by the metal frame, said cooling unit comprising a casing shaped for mounting in said metal frame to extend in its entirety inwardly from said sashes, an evaporator within said casing to cool a body of air from said room and return such air to said room and compressor and condenser means mounted within said casing and operatively connected to said evaporator, and a hinge having a vertical axis and mounted on said metal frame and said casing to accommodate pivotal movement of said room cooling unit in a horizontal plane into said room.

2. An air conditioning device for application to a double hung sash type window mounted in the exterior wall of a room and having a window frame and upper and lower sashes mounted for vertical sliding movement in said window frame; said air conditioning device including a hollow rectangular metal frame adapted for mounting on said window frame inwardly of said sashes so that vertical movement of the sashes is not impaired by the metal frame, said air conditioning device further including a cooling unit comprising a casing shaped for mounting in said metal frame so as to extend in its entirety inwardly from said sashes, a hinge having a vertical axis and mounted on said metal frame and said casing adjacent one side of said metal frame to accommodate pivotal movement of said casing in a horizontal plane into said room, and refrigeration apparatus including an evaporator, a compressor and a condenser mounted within said casing for pivotal movement therewith, whereby the windows may be exposed for washing by pivotal movement of the casing on said hinge and the location of said frame inwardly of said sashes accommodates unobstructed relative movement of said sashes without the necessity of removing said cooling unit or said metal frame from its assembled position in said window frame.

3. An air conditioning device for application to a window of a building having a window frame provided with vertically extending and laterally opposed side surfaces and a horizontal sill surface each of which extends from the plane of the window inwardly of the building; said air conditioning device comprising a hollow rectangular metal frame adapted for mounting on said surfaces inwardly of said window, said metal frame having a bottom portion adapted to abut and be secured to said sill surface, opposed side portions adapted to respectively abut and be secured to said window frame side surfaces and an upper portion spanning the space between said metal frame side portions, said air conditioning device further including a cooling unit comprising a casing having a back portion shaped to fit in telescoping relationship within said metal frame and a front portion adapted to extend inwardly of said building from said metal frame, said air conditioning device also including a hinge having a vertical axis and mounted on said frame and said casing to accommodate pivotal movement of said casing in a horizontal plane into the interior of said building, and refrigeration apparatus including an evaporator, compressor and condenser mounted within said casing for pivotal movement therewith, said back portion of said casing being located inwardly of said window and being provided with openings to accommodate the admission and discharge of outside air through said window opening.

4. An air conditioning device for application to a double hung sash type window mounted in the exterior wall of a room and having a window frame defining a window opening and upper and lower sashes mounted for vertical sliding movement in said window frame; said air conditioning device including a mounting structure comprising a metal frame adapted for mounting on said window frame inwardly of said sashes so that vertical movement of the sashes is not impaired by the metal frame, said air conditioning device further including a cooling unit comprising a casing shaped for mounting on said metal frame so as to extend in its entirety inwardly from said sashes, said window opening being unobstructed by said mounting structure in that portion of the window opening in registry with said casing, a hinge mounted on said metal frame and said casing to accommodate pivotal movement of said casing in a horizontal plane into said room to thereby accommodate unobstructed access to that portion of said window opening which is normally in registry with said casing, an evaporator and fan means within said casing to cool a body of air from said room and return such air to said room and compressor and condenser means mounted within said casing and operatively connected to said evaporator.

5. An air conditioning device for application to a window of a building having a window frame provided with vertically extending and laterally opposed side surfaces and a horizontal sill surface each of which extends from the plane of the window inwardly of the building and a lower sash member slidably mounted in said window frame for vertical movement relative thereto outwardly of said window frame surfaces; said air conditioning device comprising a hollow rectangular second frame adapted for mounting on said surfaces inwardly of said window sash so that vertical movement of said sash is not impaired by said second frame, said second frame having a lower portion adapted to abut and be secured to said sill surface, opposed side portions adapted to respectively abut and be secured to said window frame side surfaces and an upper portion spanning the space between said metal frame side portions, said metal frame further having first and second plate members respectively removably bolted to said upper and lower second frame portions adjacent vertically aligned corners of said second frame, each of said plate members extending inwardly from said frame and a pair of opposed vertically aligned pins respectively carried by said plate members adjacent the inner ends of said plate members, said air conditioning device further including a cooling unit comprising a casing having a back portion shaped to fit in telescoping relationship within said second frame and a front portion adapted to extend inwardly of said building from said second frame, said air conditioning device being provided with a pair of vertically aligned recesses respectively receiving said pins to provide a hinge to accommodate pivotal movement of said casing in a horizontal plane into the interior of said building, and refrigeration apparatus including an evaporator, compressor and condenser mounted within said casing for pivotal movement therewith, said back portion of said casing being provided with openings to accommodate the admission and discharge of outside air through said window opening and said removably bolted plate members being adapted to accommodate removal of said cooling unit from the vicinity of said window without removal of said second frame from said window frame.

6. An air conditioning device for application to a window of a building having a window frame provided with vertically extending and laterally opposed side surfaces and a horizontal sill surface each of which extends from the plane of the window inwardly of the building and a lower sash member slidably mounted in said frame for vertical movement relative thereto outwardly of said window frame surfaces, said air conditioning device comprising a hollow rectangular second frame adapted for mounting on said surfaces inwardly of said window sash so that vertical movement of said sash is not impaired by said second frame, said second frame having a bottom portion, opposed side portions and an upper portion and being adapted for installation in said window frame in a first position with said bottom portion abutting and secured to said sill surface, said opposed side portions respectively abutting and secured to said window frame side surfaces and said upper portion spanning the space between said second frame side portions, said second frame also being adapted for selective installation in said window frame in an alternative second position in which said upper portion of said second frame abuts and is secured to said sill surface while said bottom portion spans the space between the second frame side portions, said air conditioning device further including a cooling unit comprising a casing having top and bottom surfaces, a front wall, first and second side walls and a back portion shaped to fit in telescoping relationship within said second frame so that the cooling unit is adapted to extend in its entirety inwardly of said sash, said air conditioning device also including hinge means defining a vertical axis for pivotal movement of said casing in a horizontal plane into the interior of said building, said hinge means including first and second sets of first hinge elements, each set being carried adjacent one side of said casing near the top and bottom thereof and cooperating second hinge elements carried at one side of said second frame adjacent the top and bottom thereof for cooperation with a first set of said first hinge elements when said second frame is installed in said window frame in its first position and for cooperation with the second set of said first hinge elements when said second frame is installed in said window frame in its second alternative position whereby the selective installation of said second frame in said window frame accommodates either left or right hand hinging of said casing on said second frame, said air conditioning device also including refrigeration apparatus including an evaporator, compressor and condenser mounted within said casing for pivotal movement therewith, said back portion of said casing being provided with openings to accommodate the admission and discharge of outside air through said window opening.

7. An air conditioning device for application to a double hung sash type window mounted in the exterior wall of a room and having a window frame and upper and lower sashes mounted for vertical sliding movement in said window frame; said air conditioning device including a hollow rectangular metal frame adapted for mounting on said window frame inwardly of said sashes so that vertical movement of the sashes is not impaired by the metal frame, said air conditioning device further including a cooling unit comprising a casing shaped for mounting in said metal frame so as to extend in its entirety inwardly from said sashes, hinge means having a vertical axis and operable to pivotally support said casing on said metal frame and to accommodate pivotal movement of said casing in a horizontal plane into said room, said hinge means including components at each side of said casing so that the initial installation of said casing in said metal frame may be made with the hinge axis selectively located at either side of said casing, an evaporator and fan means within said casing to cool a body of air from said room and return such air to said room and compressor and condenser means mounted within said casing and operatively connected to said evaporator.

8. An air conditioning device for application to a double hung sash type window mounted in the exterior wall of a room and having a window frame and upper and lower sashes mounted for vertical sliding movement in said window frame; said air conditioning device including a hollow rectangular metal frame adapted for mounting in a first position on said window frame inwardly of said sashes so that vertical movement of the sashes is not impaired by the metal frame, said metal frame being adapted for selective installation in a second position on said window frame which is one hundred and eighty degrees rotated from its first position in a plane parallel to said sashes so that movement of said metal frame from said first to said second position constitutes an end for end rotation thereof, said air conditioning device further including a cooling unit comprising a casing shaped for mounting in said metal frame so as to extend in its entirety inwardly from said sashes, hinge means having a vertical axis and operable to pivotally support said casing on said metal frame and to accommodate pivotal movement of said casing in a horizontal plane into said room, said hinge means including upper and lower components on said metal frame which may be selectively located adjacent either side of said window opening by selecting the first or second position of said metal frame, said hinge means further including first and second sets of hinge components associated with said casing, each set of said casing hinge components including an upper and lower component adapted for cooperation with the upper and lower components on said metal frame and said sets of components being disposed adjacent opposite sides of said casing so that the initial installation of said casing in said metal frame may be made with the hinge axis selectively located at either side of said casing, an evaporator and fan means within said casing to cool a body of air from said room and return such air to said room and compressor and condenser means mounted within said casing and operatively connected to said evaporator.

9. An air conditioning device for application to a double hung sash type window mounted in the exterior wall of a room and having a window frame defining a window opening and upper and lower sashes mounted for vertical sliding movement in said window frame; said air conditioning device including a mounting structure comprising a metal frame adapted for mounting on said window frame inwardly of said sashes so that vertical movement of the sashes is not impaired by the metal frame, said air conditioning device further including a cooling unit comprising a casing shaped for mounting on said metal frame so as to extend in its entirety inwardly from said sashes, said window opening being unobstructed by said mounting structure in that portion of the window opening in registry with said casing, cooperating means on said metal frame and said casing to removably secure said casing in registry with a portion of said window opening and accommodate selective removal of said casing into said room to thereby accommodate unobstructed access to said window opening, and evaporator and fan means within said casing to cool a body of air from said room and return such air to said room and compressor and condenser means mounted within said casing and operatively connected to said evaporator.

References Cited in the file of this patent
UNITED STATES PATENTS

| | | |
|---|---|---|
| 2,279,271 | Williams | Apr. 7, 1942 |
| 2,316,640 | Williams | Apr. 13, 1943 |
| 2,560,467 | Moore | July 10, 1951 |